(No Model.) 2 Sheets—Sheet 1.

A. F. TIEDE.
CHECK ROW PLANTER.

No. 378,222. Patented Feb. 21, 1888.

WITNESSES:
C. Neveux
C. Sedgwick

INVENTOR:
A. F. Tiede
BY Munn & Co.
ATTORNEYS.

(No Model.) 2 Sheets—Sheet 2.

A. F. TIEDE.
CHECK ROW PLANTER.

No. 378,222. Patented Feb. 21, 1888.

WITNESSES:
C. Neveux
C. Sedgwick

INVENTOR:
A. F. Tiede
BY Munn & Co.
ATTORNEYS.

N. PETERS. Photo-Lithographer, Washington, D. C.

UNITED STATES PATENT OFFICE.

AUGUST F. TIEDE, OF DEEP CREEK, IOWA.

CHECK-ROW PLANTER.

SPECIFICATION forming part of Letters Patent No. 378,222, dated February 21, 1888.

Application filed July 11, 1887. Serial No. 243,976. (No model.)

*To all whom it may concern:*

Be it known that I, AUGUST F. TIEDE, of Deep Creek, in the county of Clinton and State of Iowa, have invented a new and Improved Check-Row Planter, of which the following is a full, clear, and exact description.

My invention relates to check-row planters, and has for its object to provide a simple, inexpensive, and efficient machine of this class which will drop hills of seed in accurate check-row irrespective of the contour of the ground surface, and is so constructed that the seed-dropping mechanism may be set independently of the mechanism which drives it from the spacer-shafts, to correct irregular dropping and to assure proper starting of the machine at the end of a field.

The invention consists in certain novel features of construction and combinations of parts of the check-row planter, all as hereinafter described and claimed.

Reference is to be had to the accompanying drawings, forming a part of this specification, in which similar letters of reference indicate corresponding parts in all the figures.

Figure 1:
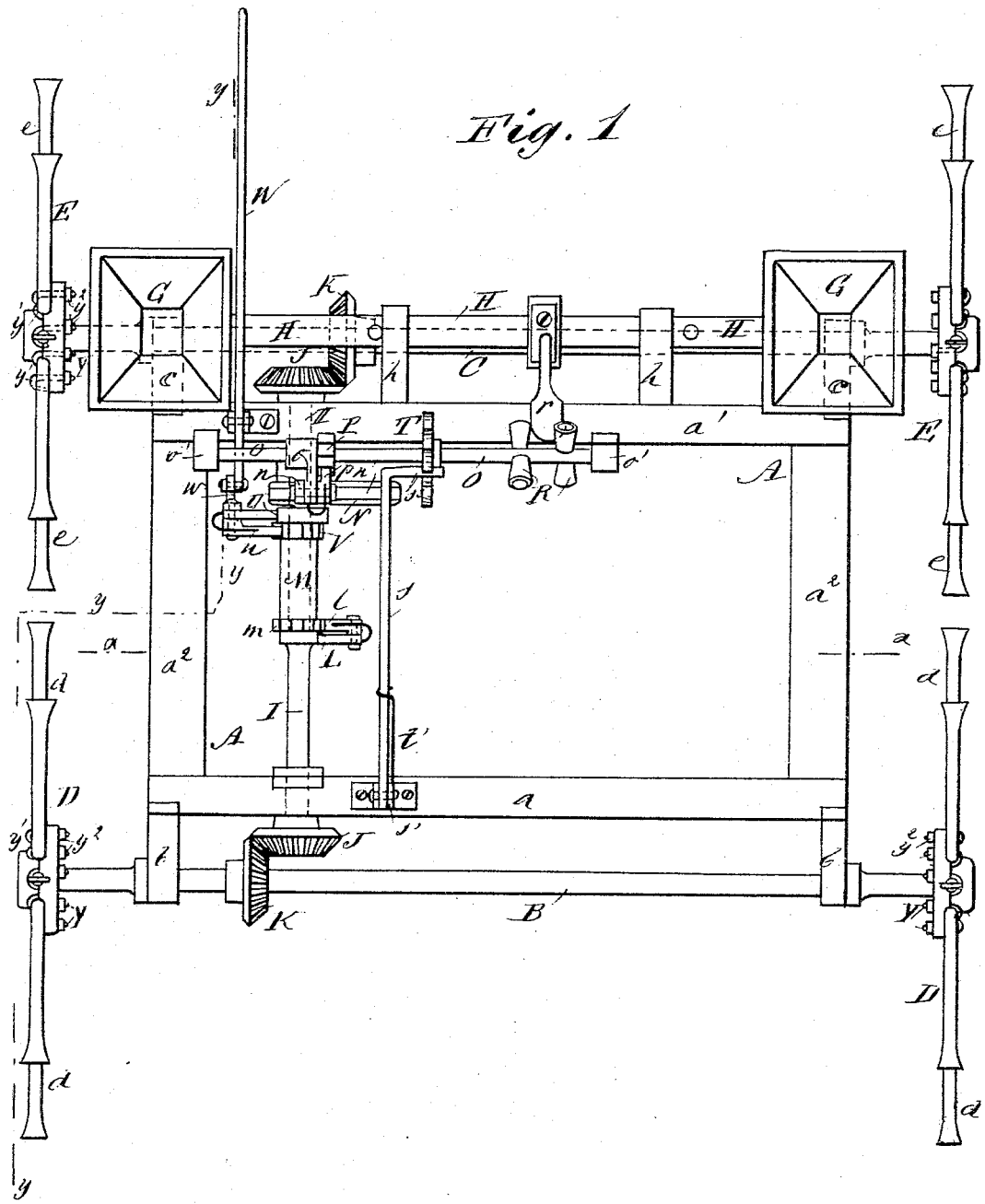
Figure 2:
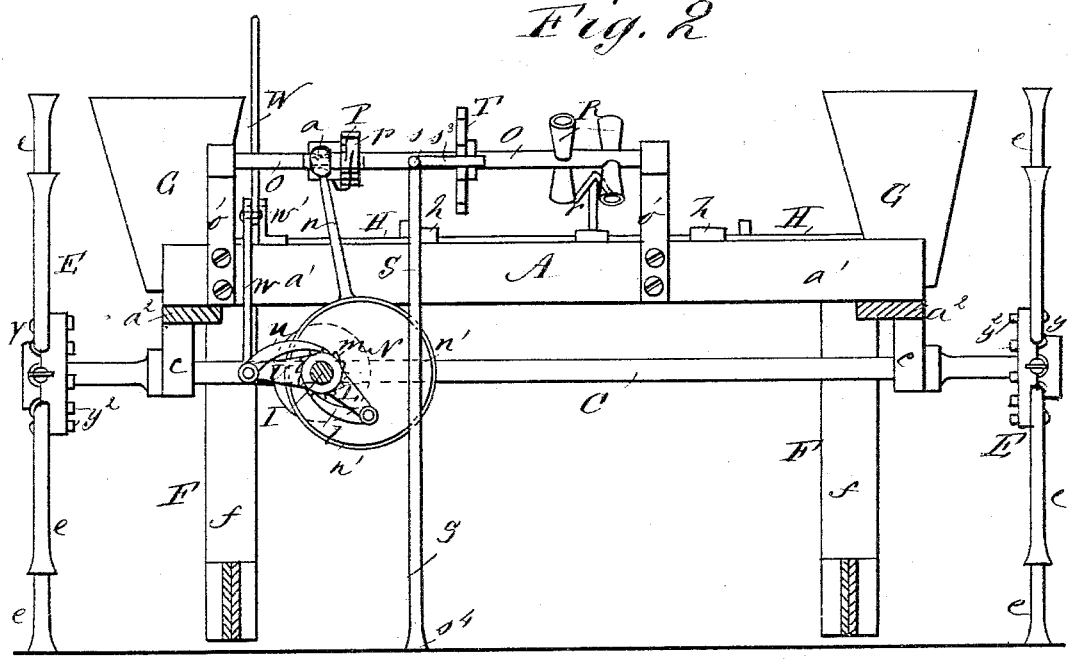
Figure 3:
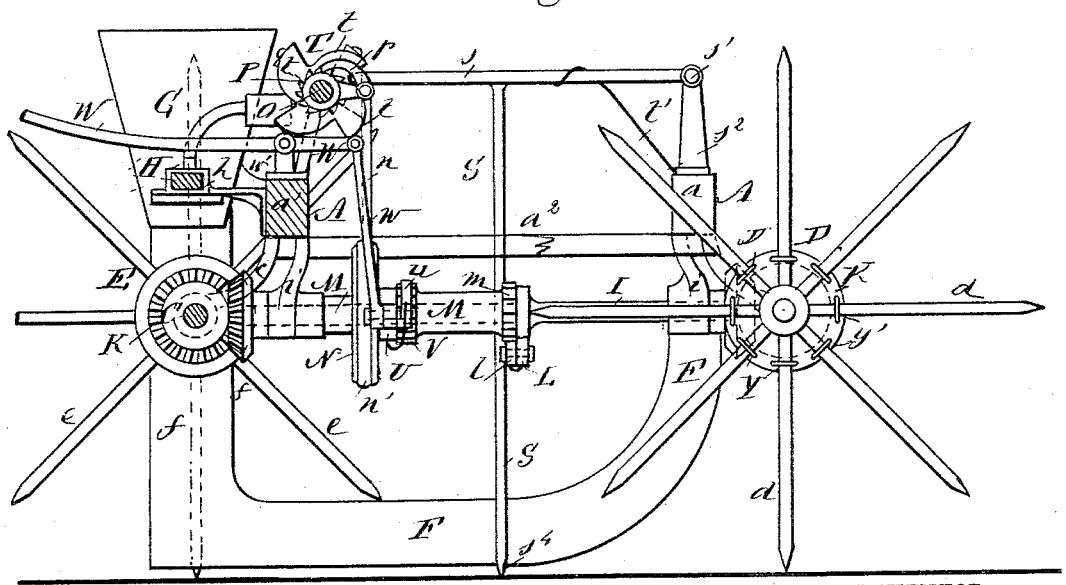

Figure 1 is a plan view of my improved check-row planter. Fig. 2 is a front view thereof, with the frame in section; and Fig. 3 is a sectional side elevation taken on the irregular line $y\,y$ of Fig. 1.

The frame A of the machine consists, mainly, of front and rear cross-bars, $a\,a'$, which may or may not be connected by opposite side bars, $a^2\,a^3$. In suitable bearings, $b\,c$, fixed to the frame A, are journaled transversely-ranging front and rear shafts, B C, to which, respectively, are fixed front and rear pairs of spacers, D D and E E, which are provided with radial arms $d\,e$, respectively, which enter the earth about to or a little deeper than the bottoms of the furrows cut by the shoes or runners F F, which are secured to the frame A and receive the seed from the boxes G G, also mounted on the frame, and from which the seed is dropped by the action of a slide, H, through the box-like rear parts, $f$, of the runners into the furrow, as hereinafter more fully explained.

On the frame A is journaled in bearings $i\,i$ a shaft, I, which ranges from front to rear of the machine, and at its opposite ends carries bevel-pinions J J, which mesh at opposite sides into the teeth of bevel gear-wheels K K, which are fixed to the front and rear shafts, B C, and whereby the shaft I and its pinions J J will compel both shafts B C to rotate in unison in like direction as the machine is drawn over the field, and thereby assure regular spacing of the hills of seed as the machine passes over cross-furrows or washouts.

To the shaft I is fixed an arm, L, which carries a spring-pressed pawl, $l$, which engages a ratchet, $m$, formed on a sleeve or long collar, M, which is placed loosely on the shaft I, and whereby as said shaft is rotated by the gearing J K the sleeve will be turned. To the sleeve is fixed an eccentric or cam-wheel, N, encircled by a strap, $n'$, having an arm, $n$, which is connected with an arm, $o$, fitted loosely on a transversely-ranging shaft, O, which is journaled in bearings $o'\,o'$, fixed to the main frame. The arm $o$ carries pivotally a spring-pressed pawl, $p$, which engages a ratchet, P, fixed to the shaft O, for turning said shaft from the cam-wheel N. The shaft O carries a series of radial arms or tappets, R, preferably provided with anti-friction rollers and adapted to act at opposite sides of an arm or plate, $r$, fixed to the seed-dropping slide H, to cause said slide to reciprocate in its bearings $h\,h$, which are fixed to the main frame A, and whereby the seed-dropping slide is actuated from the shaft I, the sleeve L, the cam-wheel N, and the shaft O to cause the seed to drop through apertures in the seed-boxes and slide to the runners D, and thence to the ground, wherein the seed will be deposited about at the depth to which the spacer-arms enter the ground to space it off. Hence the seed will be dropped at uniform distances apart of the hills irrespective of the contour of the ground surface.

The same motion of the shaft O which causes shifting of the seed-dropping slide also actuates a marker, S, which is a vertically-ranging metal rod or bar fixed to a lever, $s$, which is fulcrumed at $s'$ to a standard, $s^2$, on the main frame A, and extends rearward, and is preferably bent at right angles to form a stem, $s^3$, which is acted on by cam-faces $t$ of a tappet-wheel, T, fixed to the shaft O. A spring, $t'$, fixed to the frame A or to the standard $s^2$, forces the lever $s$ downward as each of the cam-faces $t$ passes by the stem $s^3$ of the lever to drive the end $s^4$ of the bar S into the earth and make a distinct mark therein, and the marks will be sighted across the field to test the regularity of the planting to make certain of the hills being in accurate check-row as the work progresses.

If during the operation of the machine the dropping of the seed should for any reason become irregular or is not effected in accurate check-row, or when starting the machine at the ends of rows to assure a regular check-row drop, the irregular action of the machine may be corrected or proper adjustment of the parts may be effected, and without lifting the spacers or runners from the ground, by means of mechanism next described.

On the sleeve M is hung loosely an arm, U, which carries a spring-pressed pawl, $u$, which engages a ratchet, V, fixed to the sleeve, and the arm U is connected by a link, $w$, with a lever, W, which is fulcrumed at $w'$ to the frame A or a standard thereon. It is obvious that by working the lever W the pawl $u$ may be caused to engage successive teeth of the ratchet to turn it and the sleeve and the attached cam-wheel N to adjust this wheel and set the seed-dropping slide to the required position to effect the planting in accurate check-row.

With the gearing J K proportioned about as shown in the drawings and with spacers D E about twenty inches in diameter, the machine will drop five hills for every four revolutions of the spacers; but the distance apart of the hills may be regulated at will by substituting gears J K having different relative diameters.

I attach the spacer-arms $d\ e$ to the spacer-hubs by setting the inner ends of the arms into holes in the hubs and resting the side of each arm in a notch made for it in a flange at the periphery of the hub, and bolts Y, having hooked ends $y'$, which inclose the arms, draw the latter up tightly to the hub when nuts $y^2$ on the bolts at the opposite face of the hub are tightened, as will readily be understood.

Having thus fully described my invention, I claim as new and desire to secure by Letters Patent—

1. In a check-row planter, the combination, with a frame, A, shafts B C, journaled thereon, and spacers D E, fixed to the shafts, substantially as specified, of a shaft, I, journaled on the frame between the shafts B C, and gearing J K on the shafts B C I, substantially as shown and described, whereby the spacers and their shafts will be caused to rotate in unison, as and for the purposes set forth.

2. In a check-row planter, the combination, with a frame, A, shafts B C, journaled thereon, spacers D E on said shafts, and a shaft, I, journaled on the frame between the shafts B C, substantially as specified, of a seed box or boxes on the frame, a slide, H, adapted to drop the seed and provided with an arm, $r$, a cam-wheel or eccentric, N, held on the shaft I, a strap, $n'$, on said wheel and provided with an arm, $n$, a shaft, O, journaled on the frame and carrying tappets R and a ratchet, P, a loose arm, $o$, on shaft O and provided with a pawl, $p$, engaging ratchet P, and said arm $o$ connected to the strap-arm $n$, substantially as described, for the purposes set forth.

3. In a check-row planter, the combination, with a frame, A, shafts B C I, journaled thereon and geared together at J K, and carrying spacers D E, substantially as specified, of a cam-wheel, N, held to the shaft I, a strap, $n'$, on said wheel and provided with an arm, $n$, a shaft, O, journaled on the frame and carrying a tappet-wheel, T, and a ratchet, P, a loose arm, $o$, on shaft O and provided with a pawl, $p$, engaging the ratchet P, and said arm $o$ connected to the strap-arm $n$, a marker-bar, S, fixed to a lever, $s$, fulcrumed on the frame, and said lever engaged by the tappet-wheel T, substantially as described, for the purposes set forth.

4. In a check-row planter, the combination, with a frame carrying seed-boxes and a slide adapted to drop seed therefrom, spacers supporting the frame from the ground, and a shaft, as I, driven from the spacer-shaft, of a sleeve placed loosely on the shaft I and normally connected to said shaft to be rotated by and with it, and mechanism connecting the cam-wheel with the seed-slide-operating devices, substantially as specified, whereby the cam-wheel may be set independently of the shaft I or the spacers to adjust the seed-dropping slide to assure planting in accurate check-row, as herein set forth.

5. In a check-row planter, the combination, with a frame, A, carrying a seed box or boxes, and a slide, H, adapted to drop seed therefrom, spacers supporting the frame from the ground, a shaft, I, driven from the spacers, a shaft, O, journaled on the frame and carrying a ratchet, P, and a loose arm, $o$, provided with a pawl, $p$, engaging the ratchet, and devices on shaft O actuating the seed-dropping slide H, substantially as specified, of a sleeve, M, loose on the shaft I and provided with a ratchet, $m$, an arm, L, fixed to said shaft and carrying a pawl, $l$, engaging the ratchet $m$, a cam-wheel or eccentric, N, fixed to the sleeve, a strap, $n'$, on wheel N, and having an arm, $n$, connected to the arm $o$ on the shaft O, substantially as shown and described, whereby as the shaft I is turned from the spacers the sleeve M and cam-wheel N will be turned to actuate the seed-dropping slide, and whereby, also, the cam-wheel may be set independently of the shaft I to adjust the slide to assure planting in accurate check-row, as herein set forth.

6. In a check-row planter, the combination, with a frame, A, carrying a seed box or boxes, and a slide, H, adapted to drop seed therefrom, spacers supporting the frame from the ground, a shaft, I, driven from the spacers, a shaft, O, journaled on the frame and carrying a ratchet, P, and a loose arm, $o$, provided with a pawl, $p$, engaging the ratchet, and devices on shaft O actuating the seed-dropping slide H, substantially as specified, of a sleeve, M, loose on the shaft I and provided with ratchets m V, an arm, L, fixed to shaft I and carrying a pawl, l, engaging the ratchet m, a cam-wheel or eccentric, N, fixed to the sleeve, a strap, n', on wheel N, and having an arm, n, connected to the arm o on the shaft O, an arm, U, loose on shaft I and carrying a pawl, u, engaging the ratchet V, a lever, W, fulcrumed on the frame A, and a connection, w, between said lever and the arm U, all arranged for operation substantially as described, for the purposes set forth.

AUGUST F. TIEDE.

Witnesses:
JAMES BINNS,
M. L. KIRBY.